(12) United States Patent
Catlin et al.

(10) Patent No.: US 12,100,234 B1
(45) Date of Patent: Sep. 24, 2024

(54) POST-OPTICAL CHARACTER RECOGNITION ERROR CORRECTION SYSTEM AND METHODS OF USE

(71) Applicant: Lexalytics, Inc., South Jordan, UT (US)

(72) Inventors: Jeff Catlin, Amherst, MA (US); Brian Pinette, Turners Falls, MA (US)

(73) Assignee: Lexalytics, Inc., Salt Lake City, UT (US)

( * ) Notice: Subject to any disclaimer, the term of this patent is extended or adjusted under 35 U.S.C. 154(b) by 0 days.

(21) Appl. No.: 17/454,659

(22) Filed: Nov. 12, 2021

Related U.S. Application Data

(60) Provisional application No. 63/113,332, filed on Nov. 13, 2020.

(51) Int. Cl.
*G06V 30/10* (2022.01)
*G06V 30/19* (2022.01)
*G06V 30/414* (2022.01)

(52) U.S. Cl.
CPC ...... *G06V 30/414* (2022.01); *G06V 30/19073* (2022.01)

(58) Field of Classification Search
CPC ................................ G06V 30/10–43
See application file for complete search history.

(56) References Cited

U.S. PATENT DOCUMENTS

| | | | |
|---|---|---|---|
| 5,764,799 A * | 6/1998 | Hong | G06V 30/262 382/229 |
| 9,286,526 B1 * | 3/2016 | Manohar | G06V 30/127 |
| 10,769,200 B1 * | 9/2020 | Lin | G06V 20/20 |
| 2002/0067854 A1 * | 6/2002 | Reintjes | G06F 3/04883 382/199 |
| 2002/0165873 A1 * | 11/2002 | Kwok | G06V 30/2272 715/268 |
| 2004/0086179 A1 * | 5/2004 | Ma | G06V 30/268 382/177 |
| 2008/0212877 A1 * | 9/2008 | Franco | G06V 30/262 382/182 |
| 2008/0267503 A1 * | 10/2008 | Denoue | G06V 30/19133 382/177 |
| 2009/0016606 A1 * | 1/2009 | Meyer | G06V 30/1478 382/176 |

(Continued)

*Primary Examiner* — Sean T Motsinger
(74) *Attorney, Agent, or Firm* — Thorpe North & Western, LLP; Jed H. Hansen

(57) ABSTRACT

In an exemplary embodiment, the invention comprises a principled edit-distance system that performs a method for determining the probability of character errors. In another exemplary embodiment, the invention comprises a post-OCR error correction system that performs a context-sensitive correction method. In another exemplary embodiment, the invention comprises a post-OCR error correction system that performs a comprehensive, unified correction process based on generalized edit distance analysis, wherein the objective is to find a corrected sentence that has the overall smallest edit distance across all levels. In another exemplary embodiment, the invention comprises a post-OCR error correction system that comprises one or more subjective fractional rank-based dictionaries. In another embodiment, the invention comprises a post-OCR error correction system that performs the automatic assignment of rank to words per-document dictionaries.

9 Claims, 1 Drawing Sheet

(56) References Cited

U.S. PATENT DOCUMENTS

2010/0061634 A1* 3/2010 Howie .................. G06F 16/313
      382/176
2017/0305589 A1* 10/2017 Yuyama .................... A61J 3/00

* cited by examiner

POST-OPTICAL CHARACTER RECOGNITION ERROR CORRECTION SYSTEM AND METHODS OF USE

BACKGROUND OF THE INVENTION

1. Field of the Invention

The present subject matter is related, in general to character recognition systems, and more particularly, to post-optical character recognition error correction systems and to their methods of use.

2. Background of the Invention

Electronic documents (e.g., Word documents, emails, tweets, and the like) are simply a sequence of characters (i.e., numeric codes) that represent the sequence of letters, numbers, punctuation and spaces that appear in the documents. Computers can easily process these character sequences to do useful things, such as searching the Internet.

However, many documents still exist only on paper. Even when they are photographed or scanned, their information is still inaccessible because they are represented as images, which are composed of pixels, not character sequences. Optical character recognition ("OCR") hardware and software bridge the gap between images of documents and their electronic form by converting the letters, numbers, punctuation and spaces appearing in the document image into character sequences that can be used by the computer.

Sometimes, however, the image is bad, perhaps, for example, because the image is blurry or because the physical document has been smudged, wrinkled, or otherwise damaged. When this happens, the OCR engine can make mistakes, such as by, e.g., substituting a wrong letter for the correct one, inserting spaces in the middle of words, joining two words by dropping the space between them, and the like. These mistakes change the meaning of the document, which means that the computer programs that depend on them will make mistakes, such as not finding the document in an internet search.

This problem is not just limited to scanned paper documents, but rather extends to any document that is provided in the form of images of physical text including, e.g., but not limited to, snapshots of text, computer screenshots of text, and the like. Like the scanned paper images, so to do OCR engines convert these images into electronic text.

Because OCR engines do in fact misrecognize characters, errors result in the text analytics processing pipeline. This means relevant information is unavailable to those trying to access and/or analyze the text data.

In general, the image used to generate an OCR-converted document is not available, so there is no way to check for errors by comparing the electronic document to its original image. Therefore, given this limitation, in an effort to overcome the deficiencies of OCR systems, systems and methods have been employed to conduct post-OCR error correction whereby better suited words are selected for words missed by the OCR system. That is, if a sequence of characters that do not form a known word is found, letters may be substituted into the unknown word until a word is found that is recognized. For example, the character sequence, "while" is not a word, but it can be turned into a word by substituting the letter "l" for the number "1" (tuning it into "while"), or by substituting "t" for "1" (turning it into "white").

Whether "while" or "white" is chosen depends on how likely the letters "l" or "t" will be mistaken for the number "1" and how likely it is expected that the word "while" will turn up in a document over the word "white". This way of selecting the most likely correction is conventionally referred to as the "noisy channel model" and it is the basis for many post-OCR correction algorithms, and it is incorporated into the present invention which includes the formulation and application of a novel master equation as shall be further described below herein.

The inherent difficulties in applying the noisy channel model standing alone as an OCR system or working in tandem with conventionally known post-OCR error correction systems shall be further discussed herein as shall an understanding of the inventive post-OCR error correction systems and methods of use and their advantages over the prior art.

BRIEF SUMMARY OF THE INVENTION

In a first exemplary embodiment, the invention comprises a principled edit-distance system that performs a method for determining the probability of character errors.

In a second exemplary embodiment, the invention comprises a post-OCR error correction system that performs a context-sensitive correction method.

In a third exemplary embodiment, the invention comprises a post-OCR error correction system that performs a comprehensive, unified correction process based on generalized edit distance analysis expressed as a master equation.

In a fourth exemplary embodiment, the invention comprises a post-OCR error correction system that comprises one or more subjective fractional rank-based dictionaries.

In a fifth exemplary embodiment, the invention comprises a post-OCR error correction system that performs the automatic assignment of rank to words per-document dictionaries.

These and other features and advantages of the present invention will be more fully understood from a reading of the following detailed description.

DETAILED DESCRIPTION OF THE INVENTION

Figure 1:
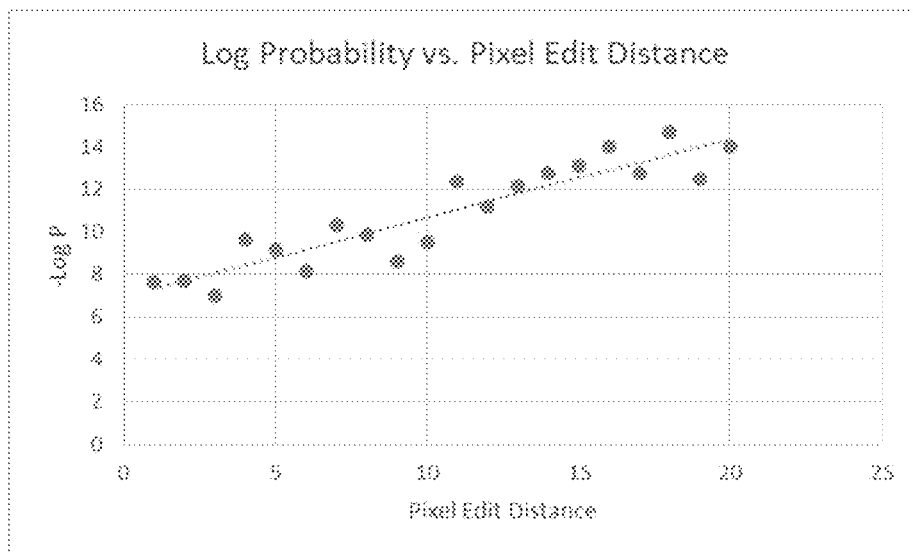
FIG. 1 is an exemplary graph depicting a linear regression over a pixel edit distance to find a log probability used to predict errors in an optical character recognition error data set.

In a first exemplary embodiment, the invention comprises a principled edit-distance method for determining the probability of character errors. The noisy channel model is only as good as its probability estimates. The probabilities of seeing "white" versus "while" in a document are well known from word frequency analyses of language. However, probabilities of mistaking the letter "t" for the number "1" versus mistaking the letter "l" for the number "1" are not at all known and are difficult to determine. In part this is because different OCR engines can make different kinds of errors. But the bigger problem is that there is no comprehensive database of OCR errors that would allow for the computation of reasonable character substitution probabilities.

Accordingly, the invention comprises a system for computing these character substitution probabilities from first principles, i.e., from the basis that a correlation exists between one character's pixel layout to another character's pixel layout. For example, when the letter "t" is visually compared to the number "1", they are both basically each just a vertical stroke, with some differences at their tops and bottoms. This means that if these two characters were overlapped in an image, most of their pixels would align, with just a few differences in pixels at their tops and bottoms. Hence, by flipping just a few pixels on and off, one of these characters could transform into the other. The number "1" and the letter "t", therefore, has a small edit distance at the pixel level.

In contrast, the letter "L", though it has a vertical stroke like the number "1", it also has a long horizontal stroke at the bottom. Since many more pixels would need to flip on and off to transform the letter "L" into the number "1", the letter "L" has a larger edit distance at the pixel level from the number "1" as compared to the pixel edit distance of the letter "t" from the number "1". Based upon the principles of edit distance, it is much less likely that an OCR engine will accidentally misread the extra pixels to interpret the number "1" as being the letter "L".

Incorporating edit distance into the post-OCR analysis of a document provides a principled way to pick the most likely character error. The principle of edit distance also applies to multiple-character transformations, such as an "m" being confused with the three-letter sequence "iii".

The method of the present invention comprises determining the edit distances for all possible errors detected during the noisy channel model of OCR correcting and assigning plausible probability values to such errors to thereby determine the proper character formation in a document.

Typically, the approach to determining the probability of OCR character errors includes counting the number of times a particular OCR error appears in the documents in a training corpus. Since single character can be mistaken for two- or three-letter sequences (e.g., "m" being confused with "iii"), there are over a million possible character substitutions. This method of determining errors is unsuitable as a training corpus is not large enough to exhibit all such possible errors and so their probabilities remain unknown.

Therefore, what is needed is a method for determining errors that uses a greatly reduced number of possible, or "candidate," character substitutions. For this purpose, the inventive system relies on pixel-edit distance. In contrast to conventionally used post-OCR error correction system, when characters are represented by images of coarsely sampled pixels as is done in the present inventive system(s), the pixel edit distances between any pair of characters is small, typically less than about 100. This means that a training corpus will typically be more than large enough to confidently estimate character substitution probabilities based on these few possible pixel edit distances.

By way of example and explanation, suppose the following phrase is found in a document: "a while", which has the numeral "1" appearing in the middle of a word. The phrase "a while" is clearly wrong, and, as such, is referred to as an error phrase, wherein "error" is used herein and throughout to refer to phrases and characters that are detected or flagged as potentially incorrect. Contrary, "candidate" as used herein and throughout refers to possible substitutions or replacements for the error.

Possible candidates for correction of "a while" include:
1. awhile
2. a while
3. a white
4. a whiter
5. a whine Choice 1, i.e., "awhile", has a word-edit distance of 1 (a single join), while choice 2, i.e., "a while" has a word-edit distance of 0; therefore, intuition suggests that choice 2 is preferred over choice 1. Similarly, reason tell us that choice 3, i.e., "a white" is preferred over choice 4, i.e., "a whiter" because choice 4 requires changing a "1" to a "t" and adding an "r" (a letter-edit distance of 2) while choice 3 requires only the first change (an edit distance of 1). Choice 3 is preferred over choice 5, i.e., "a whine", because the incorrect character "1" looks more similar to a "t" than to an "n". All of these preferences may be characterized in terms of pixel-edit distance.

Figure 2:
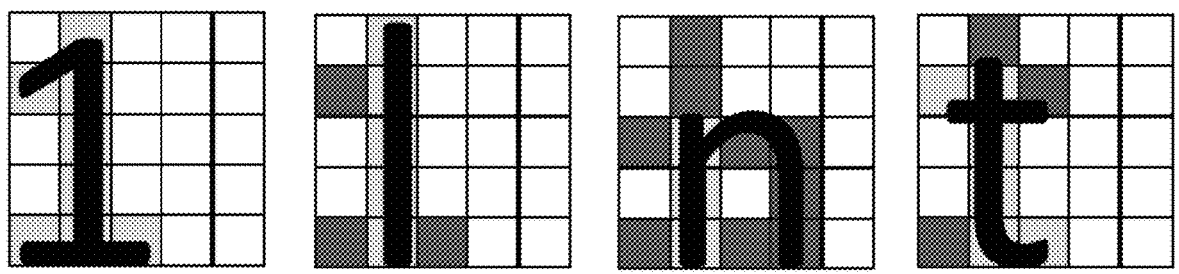
FIG. 2 is a schematic depicting an overlap of pixels for a plurality of characters.

Pixel-edit distance is illustrated in FIG. 2. The characters "1", "l", "n" and "t" are projected onto a coarse pixel grid. The pixels occupied by "1" are colored in light gray. The pixels that "l", "n" and "t" share with "1" are colored in light gray; and the pixels where they differ are colored in dark gray. As shown, "l" has an edit distance of only 3 (dark gray pixels) from "1" while "n" has an edit distance of 9, so "while" is preferred over "whine" as a correction.

A general rule for picking the best correction choice under this scenario is to pick the correction with the smallest word-edit distance, letter-edit distance and pixel-edit distance. But what if one choice has a large letter-edit distance and a small pixel-edit distance, and the other choice has the opposite: a small letter-edit distance and large pixel-edit distance? How then should the relative importance of each choice be weighed. An equation 1 has been created to create a candidate score to resolve this issue, wherein equation 1 is as follows:

$$W_{word} \times D_{word}(phrase_e, phrase_c) + W_{letter} \times D_{letter}(word_e, word_c) + W_{pixel} \times D_{pixel}(letter_e, letter_c)$$

where, $W_{word}$ is a weight value assigned to the word, $D_{word}$ is the edit distance between the error phrase and the candidate phrase, $phrase_e$ is the error phrase, $phrase_c$ is the candidate phrase, $W_{letter}$ is a weight value assigned to the letter, $D_{letter}$ is the edit distance between the error word and the candidate word, $word_e$ is the error word, $word_c$ is the candidate word, $W_{pixel}$ is the weight value assigned to the pixel, $D_{pixel}$ is the pixel edit distance between an error letter and a candidate letter, $letter_e$ is an error letter, and $letter_c$ is a candidate letter.

For choice 1 above, $D_{word}$("a while", "awhile")=1 is the word-edit distance between the two phrases because they differ by just one word split; $D_{letter}$("while", "while")=1 because they differ by just one letter, "1" versus "l"; $D_{pixel}$("while", "while")=3 because all of the differing letters differ by a total of three pixels. To get the combined edit distance between these two choices, each kind of distance D is multiplied by its own distinct numeric weighting factor W, and the sum of these products is calculated.

The correction with the smallest such distance will generally be the best choice. In this case, choice 1 has a combined edit distance of $W_{word} \times 1 + W_{letter} \times 1 + W_{pixel} \times 3$, while choice 2 above has a combined edit distance of $W_{letter} \times 1 + W_{pixel} \times 3$. So, even without knowing the actual values for the weighting factors, it is clear that choice 2 is a better correction then choice 1 because its combined edit distance is smaller.

The weighting factor to be assigned to the word, $W_{word}$, may be determined in a variety of ways, wherein, in an exemplary embodiment, it may be determined from an annotated OCR error training set. Such training sets may be created by a practitioner or may be discovered opportunistically online, typically as part of a data processing competition. Such training sets preferably show alignments between words in the gold standard text and the gold standard text as corrupted by OCR. From these alignments, a practitioner may count the instances of inserted/deleted spaces and letters and letter substitutions.

Although this method may provide a sufficient number of samples for the accurate estimation of $W_{word}$, which is derived from the probability that words have inserted/deleted spaces, it is typically inadequate for calculating accurate values for $W_{letter}$ and $W_{pixel}$. The reason for this is that to calculate $W_{letter}$ and $W_{pixel}$, the training set must be able to determine the probability that OCR confuses one letter with another, such as confusing an "m" for a "w". But an "m" could also be confused for "rn" (two letters) or for "iii" (three letters). Allowing for all these combinations of one, two and three letters, creates over a million possible cases of confusion. Since training sets typically only have thousands of samples, statistics for only a small number of these million cases can be estimated.

The systems of the present invention overcome this problem by basing the probabilities values for $W_{letter}$ and $W_{pixel}$ on pixel-edit distances. As shown in FIG. 2, there are very few pixels in a coarsely-sampled image of letters. With so few pixels, pixel-edit distances greater than 50 are rare. Accordingly, since there are only about 50 possible cases of pixel-edit distances for statistics should be collected, and since there are typically thousands of training samples, this means that there is more than enough training data available to accurately estimate the weighting factors $W_{letter}$ and $W_{pixel}$. This unique approach to establishing letter substitution probabilities in the face of missing training data is one of the reasons why the post-OCR error correction systems of the present invention are able to provide post-OCR correction when otherwise it is not generally available.

The method herein further includes a tie-breaking process such as when the combined edit distances between two word choices, as calculated from Equation 2, are equal. For example, referring to choices 2 and 3 from the example above: the images of letters "l" and "t" have the same combined edit distance $W_{letter} \times 1 + W_{pixel} \times 3$. In an exemplary embodiment, a tie between two substitution choices may be broken by providing each word a rank based on word frequency. In the scenario above, for example, since "while" is a function word in English (making it more common than "white"), "while" would be chosen over "white". This may be formalized by giving each word a rank. In an exemplary embodiment, the word "the" gets the top rank of 1 as it is the most common word in the English language. The words "while" and "white" may be appointed ranks of 5.8 and 6.6, respectively. When breaking a tie, the lower rank is preferred, and therefore, selected over the choice having a higher rank. Therefore, in the example, herein, because "while" has a lower rank than "white", "while" would be selected. By modifying equation 1 to include rank, an equation 2 is used by the system to select a word or character, wherein equation 2 is as follows:

$$\text{Rank}(word_c) + W_{word} \times D_{word}(word_e, word_c) + W_{letter} \times D_{letter}(word_e, word_c) + W_{pixel} \times D_{pixel}(word_e, word_c)$$

where, $\text{Rank}(word_c)$ is the rank value assigned to a candidate word, $W_{word}$ is a weight value assigned to the word, $D_{word}$ is the edit distance between the error phrase and the candidate phrase, $phrase_e$ is the error phrase, $phrase_c$ is the candidate phrase, $W_{letter}$ is a weight value assigned to the letter, $D_{letter}$ is the edit distance between the error word and the candidate word, $word_e$ is the error word, $word_c$ is the candidate word, $W_{pixel}$ is the weight value assigned to the pixel, $D_{pixel}$ is the pixel edit distance between an error letter and a candidate letter, $letter_e$ is an error letter, and $letter_c$ is a candidate letter.

Equation 2 is derived in a mathematically principled way by taking the negative of the logarithm of the following equation:

$$p(word_c) \times p_{word}^{D_{word}} \times p_{letter}^{D_{letter}} \times p_{pixel}^{D_{pixel}}$$

where $D_{word}$, $D_{letter}$, and $D_{pixel}$ are understood to be shorthand for $D_{word}(word_e, word_c)$, $D_{letter}(word_e, word_c)$, and $D_{pixel}(word_e, word_c)$, respectively. $p_{word}$ is the probability that a single space is erroneously inserted into a single word or that two words are joined into a single word, either of which would result in a single change in the word edit distance.

$p_{letter}$ is the probability that a single letter erroneously gets added, deleted or changed in a word. $p_{pixel}$ is the probability that the OCR process has erroneously flipped a pixel from white to black or black to white in its imaging process. $W_{word}$, $W_{letter}$, and $W_{pixel}$ are simply $-\log p_{word}$, $-\log p_{letter}$, and $-\log p_{pixel}$, respectively. (How these are estimated is described below.)

Rank ($word_c$) is computed as $-\log p(word_c) + \log p(*) + 1$, where $p(word_c)$ is the frequency of the candidate word and $p(*)$ is the frequency of the most common word in the language, which in the English language is the word "the." The "1" added to the rank computation ensures that the most common word in the language is assigned a rank of 1. Less common words preferably are assigned a higher rank value. Ranks for common vocabulary words may be computed mechanically utilizing a word frequency table (including but not limited to Google Ngram). Ranks for novel words not found in word frequency tables may be determined either heuristically (for example, by assigning the name of a newly formed company the same rank as that of a typical company) or subjectively by having a human determine a reasonable rank based upon a comparison to the ranks of other words.

An exemplary method for determining character substitution probability values based upon pixel-edit distance comprises the following steps:

1. Collect images of characters (single letters, numbers, and punctuation) from a target font, as well as pairs and triples of the same, choosing a typically-used font (such as Ariel) for the target font. Designate this font as F.
2. Reduce the resolution of the images just enough so that the thickest stroke in any letter is no wider than the width pixel in the reduced image. Designate this resolution as R. Mark a pixel in one color if it contains any part of a stroke and another color if otherwise.
3. Consider each image of a single character, character pair, or character triple. A "substitution" is a pair of such images, with correct image (the candidate) representing the original set of characters in a document, and the other image (the error) representing the characters that could be erroneously substituted by an OCR system. Consider all possible substitutions. For each substitution, shift the candidate image horizontally over the error image and count the pixels that differ at each shift. This is the pixel edit distance for this this substitution. Associate the minimum pixel edit distance found to the substitution.
4. The training set comprises a set of substitutions derived from actual OCR errors, where an erroneous single, pair, or triple of characters was substituted for the correct single, pair, or triple of characters. Reserve a fraction of this training set as a validation set. Designate the remainder of the training set as the tuning set.

5. Construct a histogram as follows: for each substitution from the tuning set, look up its associated pixel edit distance as calculated in step 3. In the histogram, increment the count in the bin for this pixel edit distance. Additionally, count the number of times a word is broken or joined.

6. For the count in each histogram bin $h_k$ (where k is the pixel edit distance), compute the negative log probability $-\log p_k$ that there will be an error with a pixel edit distance of k, where $p_k = h_k/N$ and N is the total number of characters in the tuning set. Also, compute the value $W_{word} = N_j/N$, where $N_j$ is the number of times a word is broken or joined (from step 5) (this may be the same scaling factor $W_{word}$ used in equation 2 above).

7. Perform a linear regression of the pixel edit distance k against $-\log p_k$ using a regression error function E (typically least squares). Optionally, the data point for a pixel edit distance of 0 may be omitted as this may introduce an outlier from many small punctuation marks that can be distinguished. Designate this choice as option O. The values of the y-intercept and the slope of the regression correspond, respectively, to $W_{letter}$ and $W_{pixel}$ as used in equation 2 above.

8. Using the scale factors $W_{word}$, $W_{letter}$, and $W_{pixel}$ found in steps 6 and 7 applied to Equation 2, find the best substitution (i.e., the one with the lowest value of Equation 2) for each error in the validation set. The set of correctly-identified substitutions can be expressed as a score S, which could be the error function E over the validation set or such measures as F1 or accuracy. It is possible to repeat steps 1 through 7 with different fonts F, image resolutions R and different choices for option O and error function E until a regression with the best overall score S is found.

This linear regression was performed over the pixel edit distances to find a log probability fit that best predicted the errors in a small OCR error data set. As shown in FIG. 1, it was found that a greater edit distance indeed corresponded to a lower chance of a substitution being correct.

In a second embodiment, the invention comprises a post-OCR error correction system that performs a context-sensitive correction method. As discussed above in the context of the first embodiment, when given a choice between correcting "a while" to "a while" or "a white", most post-OCR error correction systems will choose "a while" because "while" has a lower rank than "white". However, if it was known that "a while" was embedded in a larger phrase, e.g., "a while house", with this little bit of extra context, intuition likely would lead to correcting "while" with "white" over "while". An exemplary embodiment of the invention, then, uses contextual information obtained from conventionally known language models in post-OCR error correction to choose the most likely substitute.

A language model is a computational artifact that predicts which word will likely appear at some place in a sentence based on the words surrounding it. A standard approach to creating a language model includes creating a dictionary of all possible phrases having lengths of up to about 5 words that have ever been seen in documents and assigning each of the phrases a frequency of occurrence. The number of possible phrases is enormously large, and there is typically not enough training data to estimate frequencies of occurrence for all of them which creates the problem of missing data.

More recently, machine learning (ML) techniques have been used to create more compact language models. One such language model is known as the bidirectional encoder representations from transformers ("BERT") which was developed by Google, Inc. Unlike the phrase-based model, which has a limited context of no more than about 5 words, BERT can make use of up to about 500 words and punctuation symbols as context.

In application, a language model may be given a sentence, such as, "I gave my dog a _____", and is expected to fill in the blank. The model has no way of knowing what word actually goes in the blank, but based on the context of the preceding words ("I gave my dog a"), it can produce the top N words most likely to appear next and assign them a contextual rank, such as:

| Candidate Word | Contextual Rank |
|---|---|
| Bone | 4.5 |
| Bath | 6.8 |
| Pat | 7.1 |

Using contextual information obtained from a language model, the system and method of the present embodiment integrates this ranking into the equations 1 and 2 as discussed above to execute the following equation 3 which takes context into consideration when selecting the proper character or word substitute:

Equation 3 shows how contextual rank is used to compute a score for each candidate:

$$\text{Rank}(\text{word}_c|\text{context}) + W_{word} \times D_{word}(\text{word}_e, \text{word}_c) + W_{letter} \times D_{letter}(\text{word}_e, \text{word}_c) + W_{pixel} \times D_{pixel}(\text{word}_e, \text{word}_c)$$

Note that Equation 3 is just like Equation 2 except that it uses a contextual rank rather than an absolute rank based on the candidate's word frequency. As with Equation 2, a candidate's score is a combination of its rank and scaled edit distances. The candidate with the lower such score gets chosen as the best correction for an OCR error.

In an exemplary embodiment, then, the post-OCR error correction system of the present invention uses a language model, such as BERT, to provide a list of candidate words that could fill in the blank in a sentence. The system then applies a method of determining the contextual probability of each of the candidates, which is converted to a contextual rank that is then used in the master equation along with edit distances to pick the best correction. In other words, rather than picking a word based merely on its frequency of occurrence in a language, the system of the present invention uses the language model to generate a list of possible corrections and their probabilities based on their context.

As one example of how the system would pick the most likely correction based on the context of surrounding words in the sentence, consider "while" and "white", which are equally good corrections for "while" because they both involve just a single character substitution, and these substitutions—the characters "l" and "t"—have the same pixel edit distance from "1". However, based on in the sentence "I live in the while house", the system prefers "white" as the correction over "while", but in the sentence "I tripped while running", the system prefers "while" over "white". In both cases, the contextual probability from the language model is used to break the tie.

By using contextual cues to compute more nuanced probabilities, a 10% improvement was found in error reduction over methods that simply use the occurrence frequencies of isolated words. To date, no one has used a sophisticated language model to provide context-sensitive post-OCR error correction.

In a third exemplary embodiment, the invention comprises a comprehensive, unified correction process based on generalized edit distance. As well as misrecognizing letters in words, sometimes OCR engines break apart or join words. Consider the misrecognized sentence "the boy li ved ath0me" (which should be "The boy lived at home"). Any post-OCR error correction method that merely corrected each "word" in this sentence would fail because "li ved" needs to be joined to become "lived" and "ath0me" needs to be broken apart to become "at home" before correction of "h0me" can take place. At the word level, there is an edit distance of 2 between the misrecognized sentence and the correct one: one word split plus one word join.

At the character level, the character sequence "home" needs to be corrected to "home" by changing the character "0" to "o". This is an edit distance of 1. And at the pixel level, the edit distance between "0" and "o" is considered. The goal is to find a corrected sentence that has the overall smallest edit distance across all levels: the fewest number of word joins/splits, the fewest number of character substitutions, and the fewest number of pixel differences. Therefore, in an exemplary embodiment, the system(s) and its method (s), considers all levels of a sentence, e.g., word, character, and pixel, in doing post-OCR correction.

In an exemplary embodiment, the system applies either exemplary Equation 2 or exemplary Equation 3 to perform this unified correction process with Equation 2 being used if the rank of the correction word is taken from an embedded dictionary or per-document dictionary and Equation 3 being used if the rank of the correction word is being taken from a language model.

In a fourth exemplary embodiment, the invention comprises a post-OCR error correction system that comprises one or more subjective rank-based dictionaries, henceforth designated as "operating" dictionaries since they are available to the OCR correction system throughout the correction process.

It is a fact that post-OCR error correction must be driven by dictionaries. For example, there is no way to guess that "iPhone" should be spelled with a small "i" and a capital "p" without having seen it spelled this way and having committed it to memory, i.e., a dictionary. What this means for post-OCR error correction methods is that when a new word (e.g., new slang, a new product, a new company, and the like) shows up in a document, it will not be corrected if it is misspelled. Worse, even when it is correctly spelled in the document, it might get "corrected" to a known word because it is not known by the correction system. Accordingly, for a correction system to be usable in production, it must satisfactorily address the issue of out-of-vocabulary ("OOV") words.

Maintainers of the post-OCR error correction system must be able to add new words to the system's vocabulary as needed. This involves more than adding just the word itself to a dictionary. Because the correction process requires word-frequency estimates, the maintainer must also add the probability of the word occurring in the document to the dictionary. In general, there is no way that the maintainer can accurately guess the value of this number.

To solve this problem, an exemplary post-OCR error correction system comprises a user-curated dictionary to which, as they are discovered, users add newly discovered OOV words. A dictionary is simply a list of words paired with their ranks. An exemplary dictionary would simply be a file listing one word and its rank per line, but this does not preclude other implementations, such as a database table. There can be multiple dictionaries for multiple OCR correction processes, for example, different dictionaries for different languages.

To ensure that the post-OCR error correction functions properly, the user also assigns an appropriate rank value to each OOV word. If the user happens to know that the frequency of occurrence of some OOV word is F, he can add the word to the dictionary with the rank of $-\log F + \log F^* + 1$, where $F^*$ is the frequency of the most common word in the language (e.g., the word "the" in English).

It would be highly unusual, however, for a user to have an accurate assessment of frequency of OOV words, and yet the words should be assigned some kind of rank to ensure good OCR error correction. To account for this, in this embodiment, the user may assign a subjective rank value to the OOV word. In an exemplary method, an OOV word, such as the name of a company, may be assigned a rank by a user by inspecting a supplied-dictionary of company names to determine what a typical rank might be. Based on this information, the user can assign the rank of the new company name accordingly. For example, Microsoft, a large company with lots of mentions, may have a rank of 6.0; BJs Wholesale Club, a smaller company with fewer mentions, may have a rank of 8.0. If the user believes that mentions of the new company name lie somewhere between, the user may assign the new company name a rank of 7.0. This number should be within the range of legitimacy such that the post-OCR error correction will function properly.

People are accustomed to and comfortable with assigning subjective ratings on review sites, e.g., the five-star product review system on Amazon. At the same time, they can be highly innumerate, not really being able to estimate correct magnitudes for real-world quantities, such as relative probabilities. The novelty of the approach to dictionaries used here is that it allows users to maintain dictionaries using only subjective ranks, a skill that they are facile with. Within the OCR error correction process, these ranks get automatically translated into word frequencies that allow error correction to operate properly. In particular, the estimated frequency of a word is just proportional to 10 raised to negative power of the word's rank, i.e., $\text{Freq}=10^{-Rank}$.

As is to be understood in this embodiment, no restrictions are to be made on the implementation of the dictionary. The dictionary may comprise, e.g., without limitation, a simple file, a database, and the like. Whatever form the dictionary takes, the implementation of the dictionary maintains an association between a word and its rank.

In a fifth exemplary embodiment, the system assigns a rank to words by way of "per-document" dictionaries. In an exemplary embodiment, if an OOV word occurs several times in a document, its rank is computed from its frequency of occurrence in the document and the word is added to a per-document dictionary that exists only for the duration of the processing of that document. In this case the problem of missing data for the OOV word is circumvented by automatically estimating ranks from the document alone. Creating a per-document dictionary for OOV words seen many times in a document is a way to prevent the OOV words from being "corrected" to known words found in the operating dictionary. If an OOV word occurs many times in a document, but is misrecognized just a few times by OCR, then the per-document dictionary can be used to correct the misrecognized unknown words.

The key idea behind a per-document dictionary is that the ranks computed for its OOV words should be interoperable with the ranks maintained for the words in the operating dictionaries. That is, their ranks should not be so large that the in-document dictionary entries are never preferred to those found in the operating dictionary and not so small that appropriate words from the operating dictionary are never preferred.

An exemplary method for constructing the entries for an in-document dictionary comprises:

- for each document, count the number of times each word occurs in the document. Ignore any word that occurs in an operating dictionary. Also, ignore any word that does not occur at least max (2,K) times. (The purpose of K is to ensure that the word occurs enough times in a document to make it likely that it is an actual, correctly-spelled word.); and
- for each word found in step 1, compute its rank R=−log C/(max(N,M))+log F*+1, where C is the number of times the word appears in its document, N is the number of words in the document, M is the minimum document size (in words) is being considered, and F* is the word frequency (i.e., probability) of the most frequent word in the language. (The purpose of M is to ensure that short documents don't assign overly-small ranks to words in short documents.)

Since in-document dictionary documents are created on the fly, they can be expected to be solely maintained in memory in some sort of data structure. As is to be understood in this embodiment, there is no restriction on the type of data structure. The operating dictionaries, because they are available across documents, may be maintained in a persistent store. As is to be understood in this embodiment, no restrictions are to be made on the implementation of the operating dictionary, which may comprise, e.g., without limitation, a simple file, a database, and the like. Whatever form the dictionary takes, the implementation of the dictionary maintains an association between a word and its rank. During OCR error correction, the correction process looks up candidate words and their ranks in both the in-document and the operating dictionaries.

It is to be recognized that various alterations, modifications, and/or additions may be introduced into the constructions and arrangements of parts and the methods performed described above without departing from the spirit or ambit of the present invention. It is further understood that any one or more of the specific embodiments disclosed herein may include any one or more of the other embodiments disclosed herein including modifications and alterations thereto.

What is claimed is:

1. A method for determining a probability of optical character recognition substitution errors in a text to thereby improve the likelihood of properly correcting optical character recognition substitution errors made during a post-optical character recognition process, said method comprising: estimating character substitution probabilities based on pixel edit distances between characters, wherein said estimating comprises: determining a pixel layout of a candidate character; determining a pixel layout of an error character; and determining a number of non-overlapping pixels between the candidate character and the error character, wherein the method for determining the probability of optical character recognition substitution errors further comprises one or more of: determining a word edit distance between a candidate word that contains the candidate character and an error word that contains the error character, which includes: (i) counting a number of spaces between a series of characters that form a candidate word to derive a number of candidate words; (ii) counting a number of spaces between a series of characters that form an error word to derive a number of error words; and (iii) subtracting the number of candidate words from the number of error words; and determining the character edit distance between the candidate character and the error character, which includes: (i) identifying each character contained in the candidate word to derive a set of candidate characters; (ii) identifying each character contained in the error word to derive a set of error characters; and (iii) identifying a number of characters that differ between the set of candidate characters and the set of error characters.

2. The method of claim 1, wherein the method for determining the probability of optical character recognition substitution errors further comprises: determining the word edit distance between the candidate word that contains the candidate character and the error word that contains the error character; and determining the character edit distance between the candidate character and the error character.

3. The method of claim 2, wherein the method for determining the probability of optical character recognition substitution errors further comprises taking a sum of the word edit distance, the character edit distance, and the pixel edit distance.

4. The method of claim 2, wherein the method for determining the probability of optical character recognition substitution errors further comprises assigning a weight value to the candidate word, assigning a weight value to the candidate character, and assigning a weight value to the candidate pixel.

5. The method of claim 4, wherein the method for determining the probability of optical character recognition substitution errors further comprises: taking a product of the word edit distance and the weight value of the word edit distance to derive a word product; taking a product of the character edit distance and the weight value of the candidate character to derive a character product; taking a product of the pixel edit distance and the weight value of the candidate pixel to derive a pixel product; and summing the word product, the character product, and the pixel product.

6. The method of claim 5, wherein assigning the weight value to the candidate character and assigning the weight value to the candidate pixel is based on pixel edit distances.

7. The method of claim 5, wherein the method for determining the probability of optical character recognition substitution errors further comprises assigning a rank value to the candidate word, wherein the rank value is added to the sum of the word edit distance, the character edit distance, and the pixel edit distance.

8. The method of claim 5, wherein the method further comprises performing a context-sensitive step, said step comprising obtaining contextual information from a language model, and thereby assigning a context-sensitive rank value.

9. The method of claim 8, wherein the method for determining the probability of optical character recognition substitution errors further comprises adding the context sensitive rank value to the sum of the word edit distance, the character edit distance, and the pixel edit distance.

* * * * *